Dec. 18, 1928.  1,695,497
C. H. LAND
HYDRAULIC CONTROLLED TRAILER LEG
Filed March 16, 1927  6 Sheets-Sheet 1
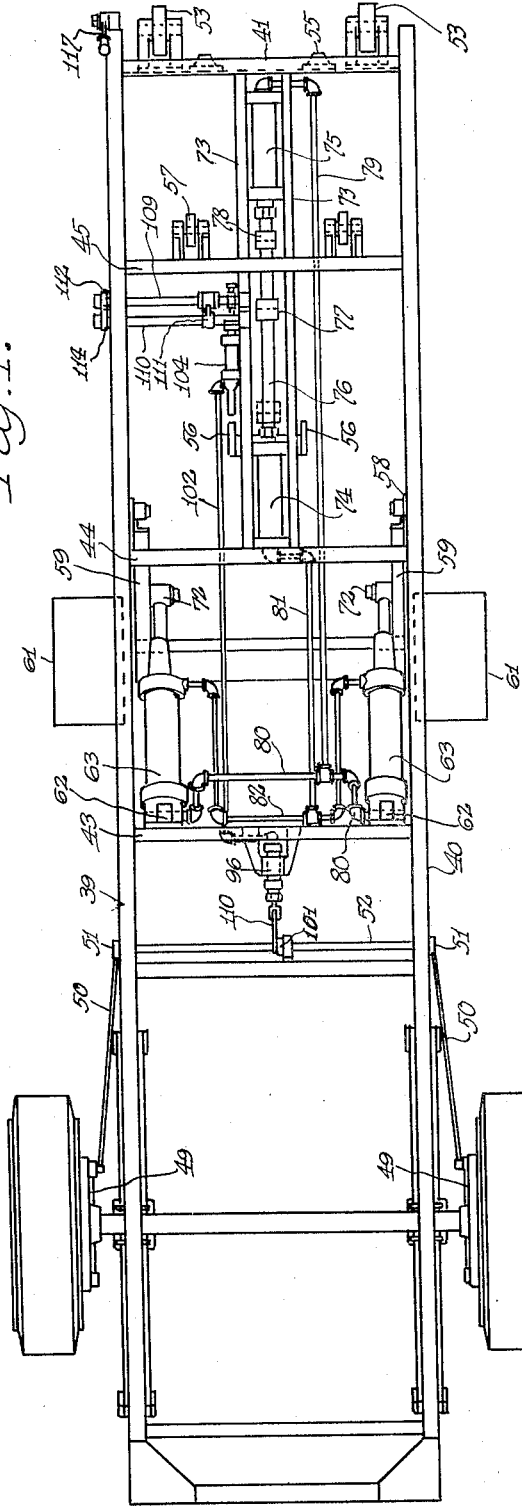
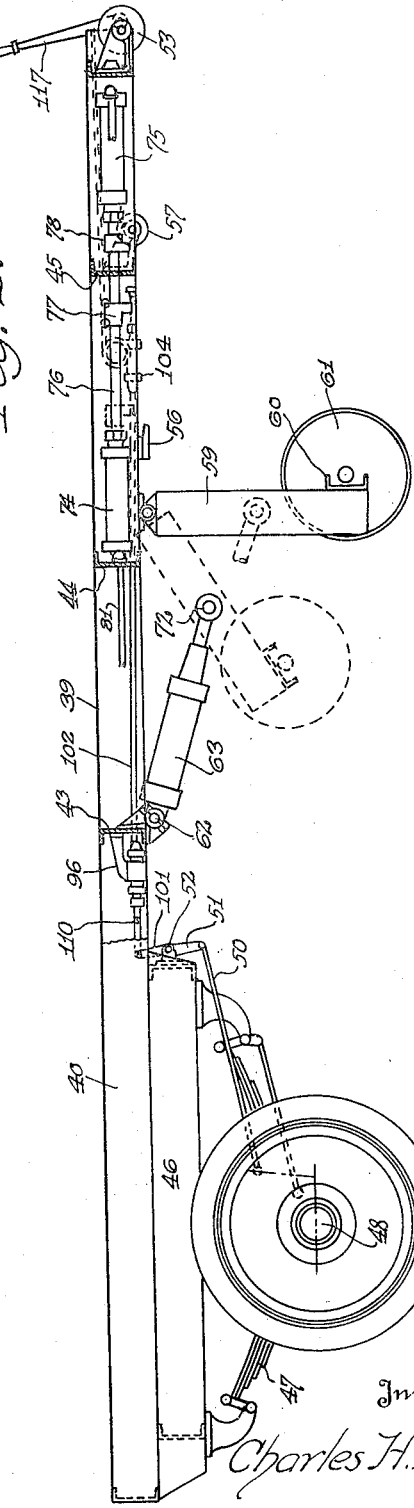
Inventor
Charles H. Land,
By
Attorneys Dec. 18, 1928.

C. H. LAND 1,695,497

HYDRAULIC CONTROLLED TRAILER LEG

Filed March 16, 1927    6 Sheets-Sheet 2

Inventor
Charles H. Land,
By
Attorneys

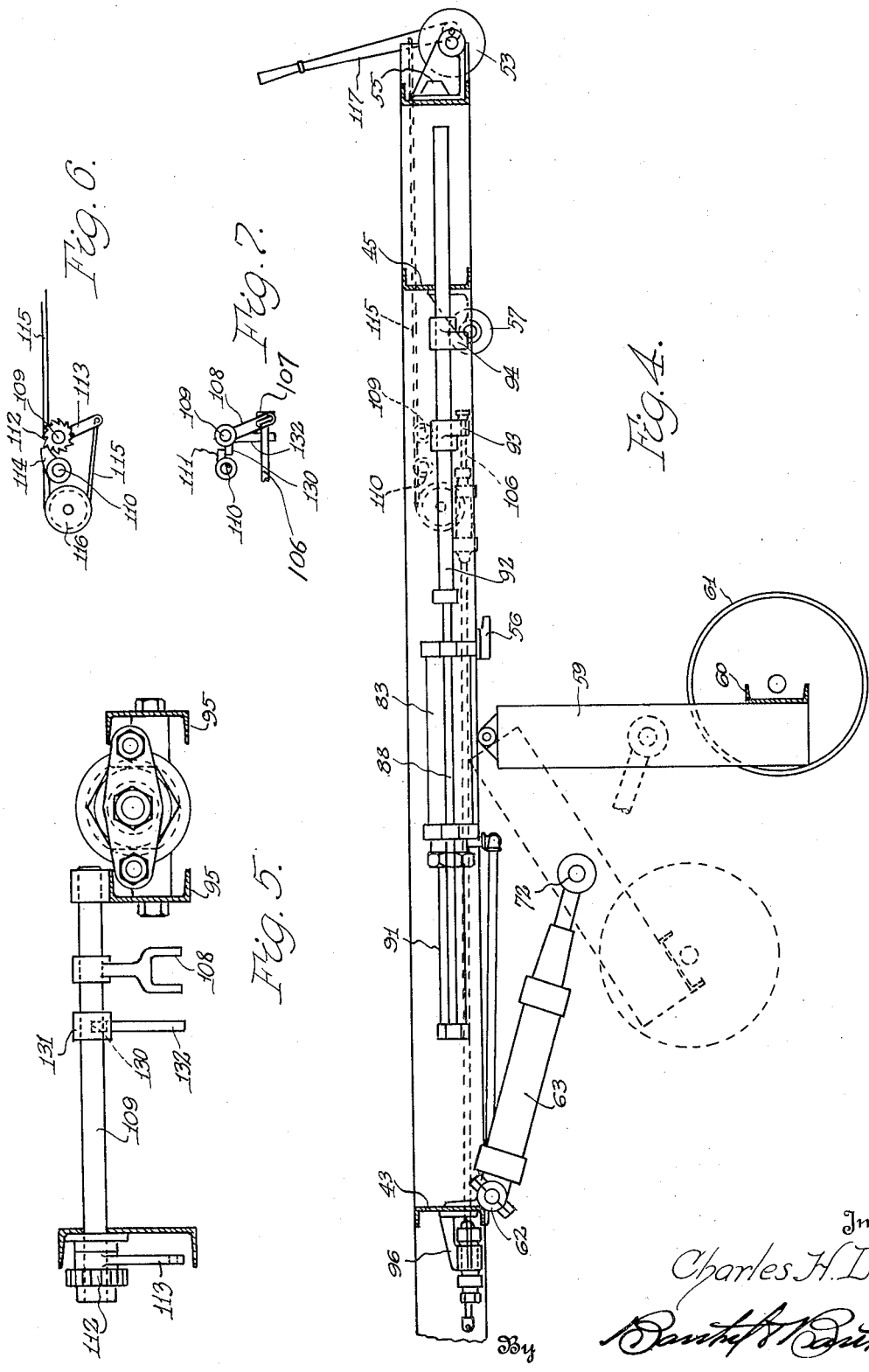

Dec. 18, 1928.  C. H. LAND  1,695,497
HYDRAULIC CONTROLLED TRAILER LEG
Filed March 16, 1927     6 Sheets-Sheet 4
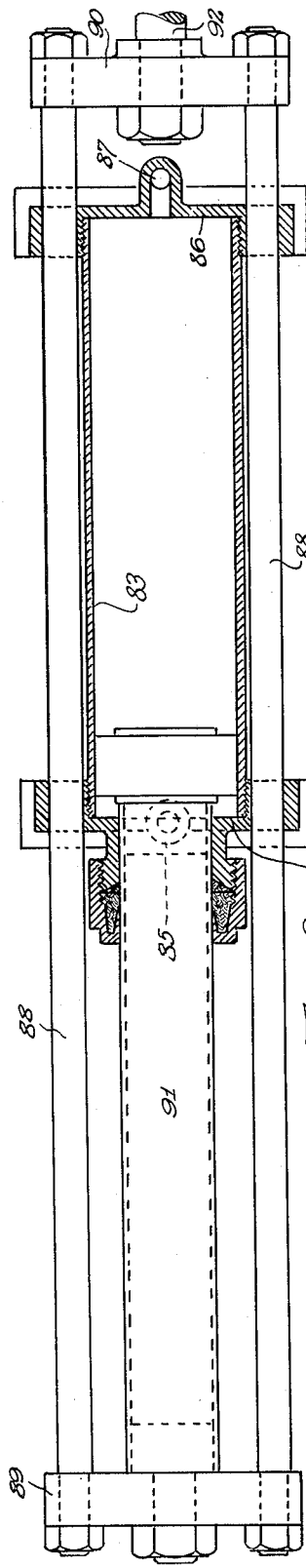
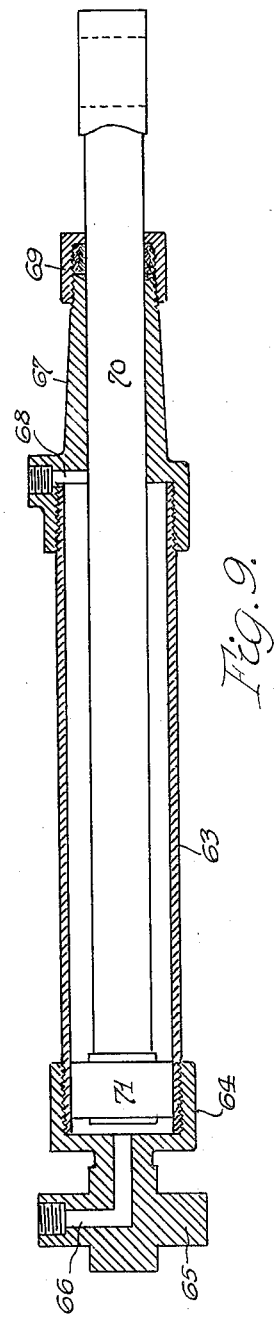
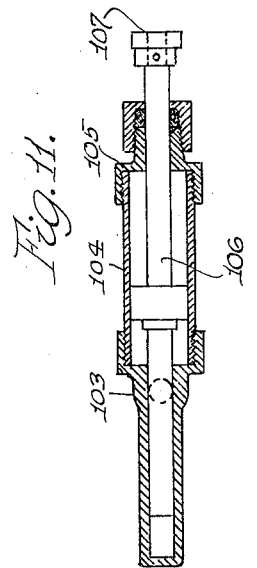
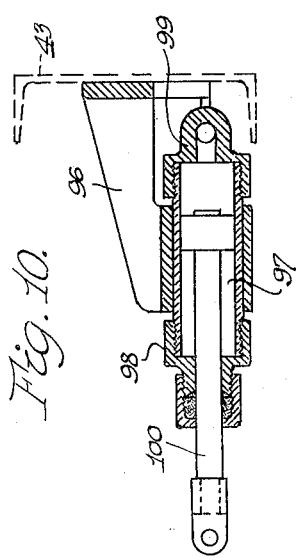
Inventor
Charles H. Land,
By
Attorneys Dec. 18, 1928.  
C. H. LAND  
HYDRAULIC CONTROLLED TRAILER LEG  
Filed March 16, 1927 6 Sheets-Sheet 5
1,695,497
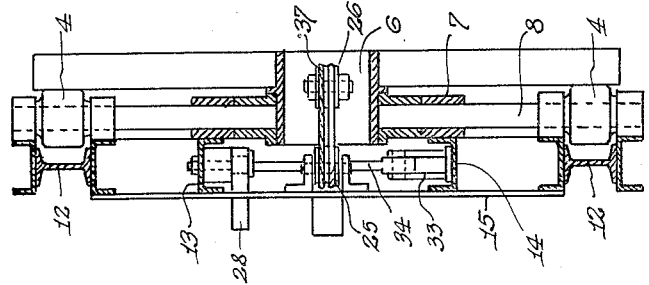
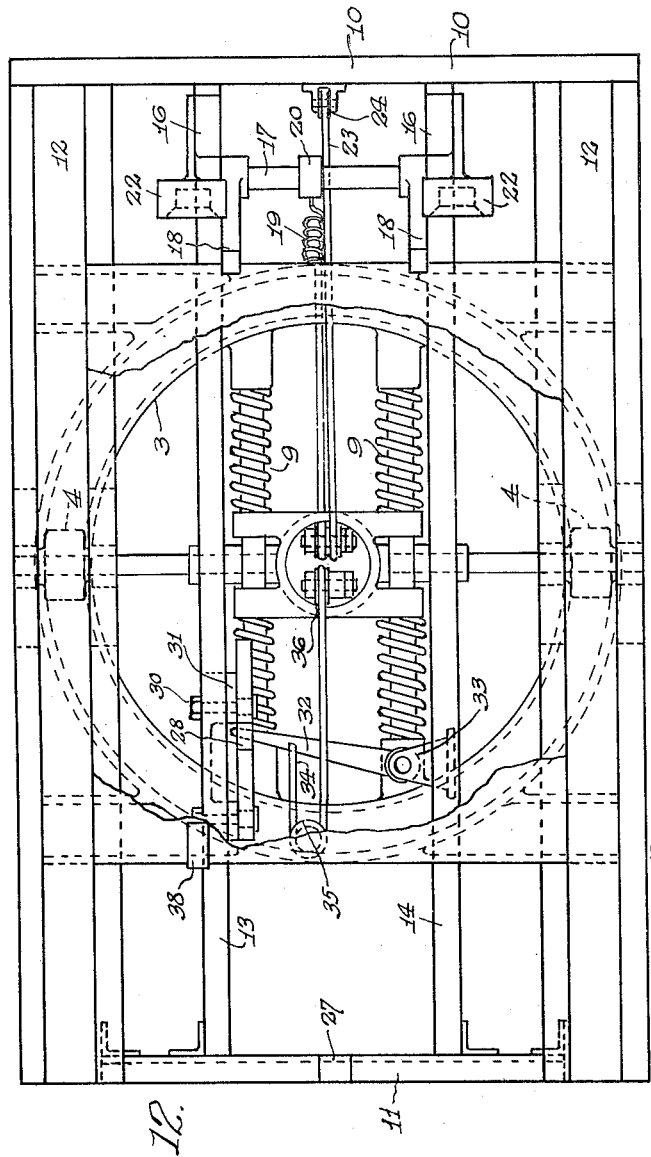
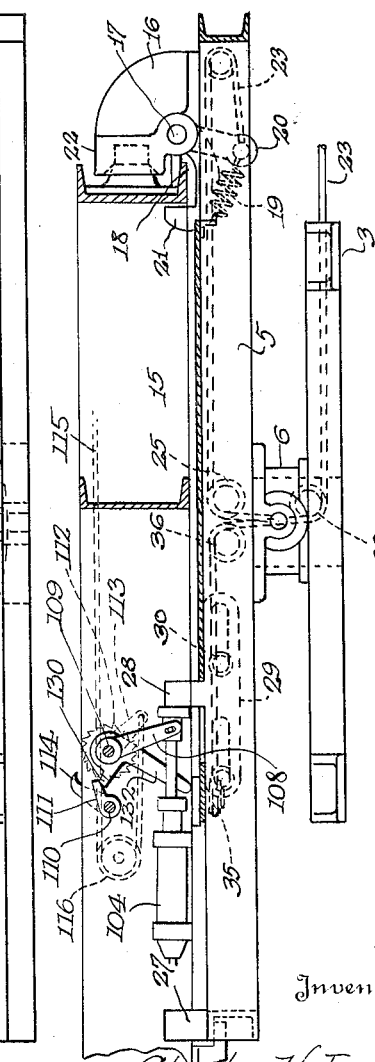
Inventor  
Charles H. Land,  
By  
Attorneys Dec. 18, 1928.  
C. H. LAND  
1,695,497  
HYDRAULIC CONTROLLED TRAILER LEG  
Filed March 16, 1927  6 Sheets-Sheet 6
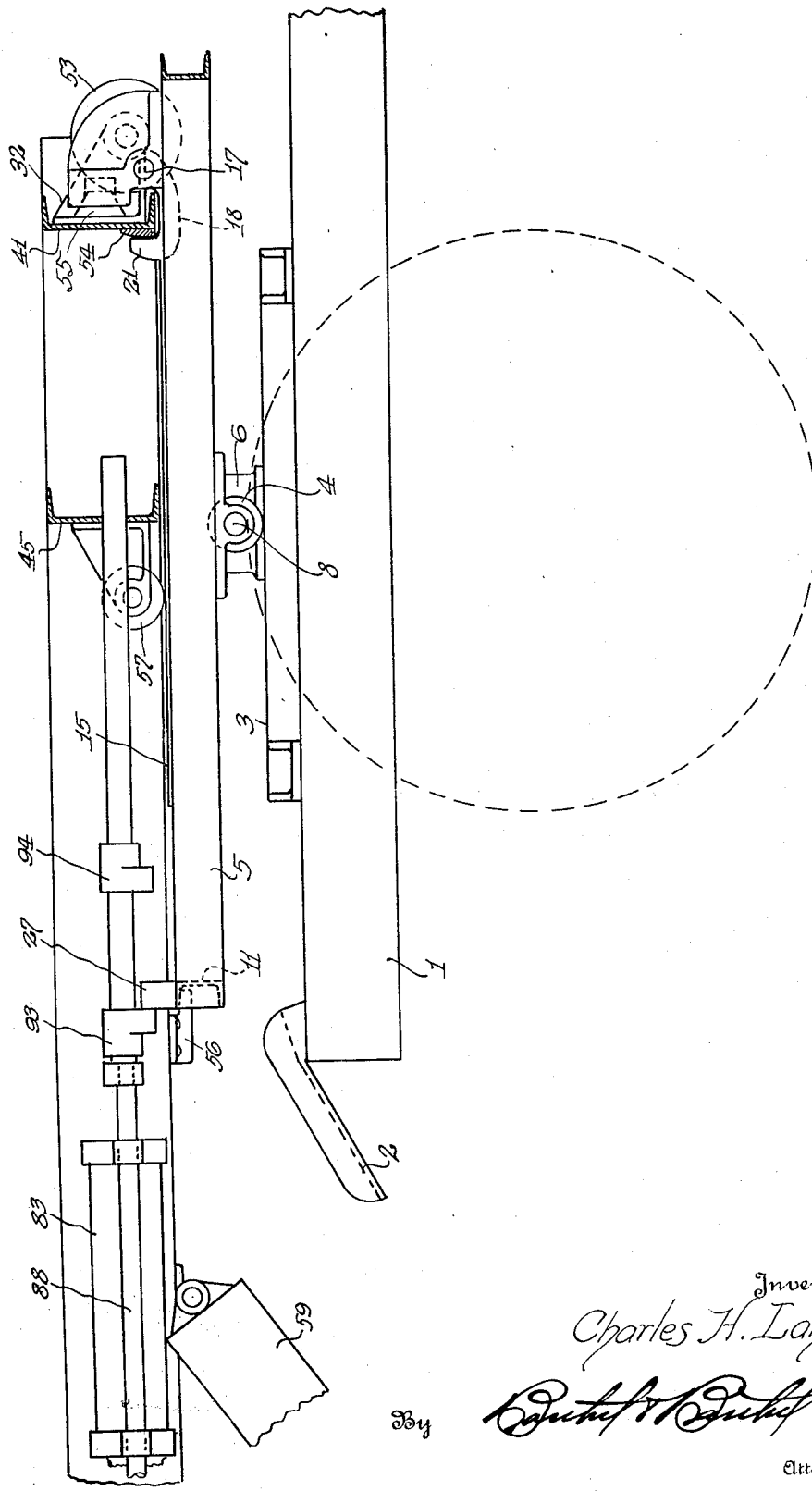

Patented Dec. 18, 1928.

1,695,497

UNITED STATES PATENT OFFICE.

CHARLES H. LAND, OF DETROIT, MICHIGAN.

HYDRAULIC-CONTROLLED TRAILER LEG.

Application filed March 16, 1927. Serial No. 175,744.

In the art of vehicles there are tractor trailer combinations wherein the rear end of a tractor is adapted to be backed under the forward end of a trailer and automatically coupled thereto for combined service. The trailer equipment ordinarily includes a shiftable leg at the forward end of the trailer adapted to assume an inactive position during combined tractor trailer service and assume an active position so that the trailer may be used independently of the tractor. The trailer equipment also includes a brake mechanism operable from the tractor, during combined service and operable on the trailer alone for independent service. The tractor equipment ordinarily includes a draft appliance, trailer supporting platform, coupling member and control mechanism incident to combined tractor and trailer service. It is in connection with this type of tractor trailer combination that I have certain means, which may be characterized as follows:

First, there is a pivoted leg for the forward end of the trailer which leg may be shifted by hydraulic means set in action by the tractor incident to coupling and uncoupling operations, the hydraulic means insuring an automatic positive and reliable action of the pivoted leg without any attention on the part of the tractor driver.

Second, there is a swivel or fifth wheel action between the tractor and trailer wherein a tiltable fifth wheel member or trailer supporting platform automatically establishes a connection between the tractor and the trailer leg operating mechanism by which movement of the tractor is translated to the leg of the trailer, and this same tiltable fifth wheel member establishes a control for the trailer brakes from the tractor.

Third, the improved means, involve a series of cylinders connected so that fluid pressure may be utilized for shifting pistons operatively connected directly or indirectly to trailer elements adapted to be adjusted. In some of the cylinders the pistons are mechanically operated to produce the fluid pressure for other cylinders, and this form of hydraulic control is compactly arranged, accessible, and of such construction that wear and tear is reduced to a minimum.

The above are a few of the characteristic features of my invention and others will hereinafter appear as the construction and operation of the tractor trailer combination is described in detail by aid of the drawings which will now be considered.

Figure 1 is a plan of the trailer in condition for service independent of a tractor;

Fig. 2 is a side elevation of the same, partly in longitudinal section, showing by dotted lines the pivoted leg in an inactive position;

Fig. 4 is an enlarged longitudinal section of the same, showing an active position of the pivoted leg in full lines and an inactive position of the leg by dotted lines;

Fig. 5 is an enlarged cross sectional view taken on or about the line V—V of Fig. 3;

Fig. 6 is a side elevation of a ratchet mechanism forming part of the trailer brake control mechanism;

Fig. 7 is a detail view of a portion of the trailer brake control mechanism;

Fig. 8 is an enlarged longitudinal sectional view of the main hydraulic cylinder of the trailer equipment shown in Figs. 3 and 4;

Fig. 9 is an enlarged longitudinal sectional view of one of the leg hydraulic cylinders of the trailer equipment;

Fig. 10 is an enlarged longitudinal sectional view of one of the trailer brake hydraulic cylinders;

Fig. 11 is a similar view of another of the trailer brake hydraulic cylinders;

Fig. 12 is a plan of the fifth wheel assembly of the tractor;

Fig. 13 is a side elevation of the same partly in longitudinal section;

Fig. 14 is a cross sectional view of the fifth wheel assembly as projected from Fig. 12, the view showing the assembly on edge or in a position at a right angle to a natural position of the fifth wheel assembly, and Fig. 15 is an enlarged diagrammatic view of the forward end of the trailer as coupled to the rear end of the tractor.

Figure 3:
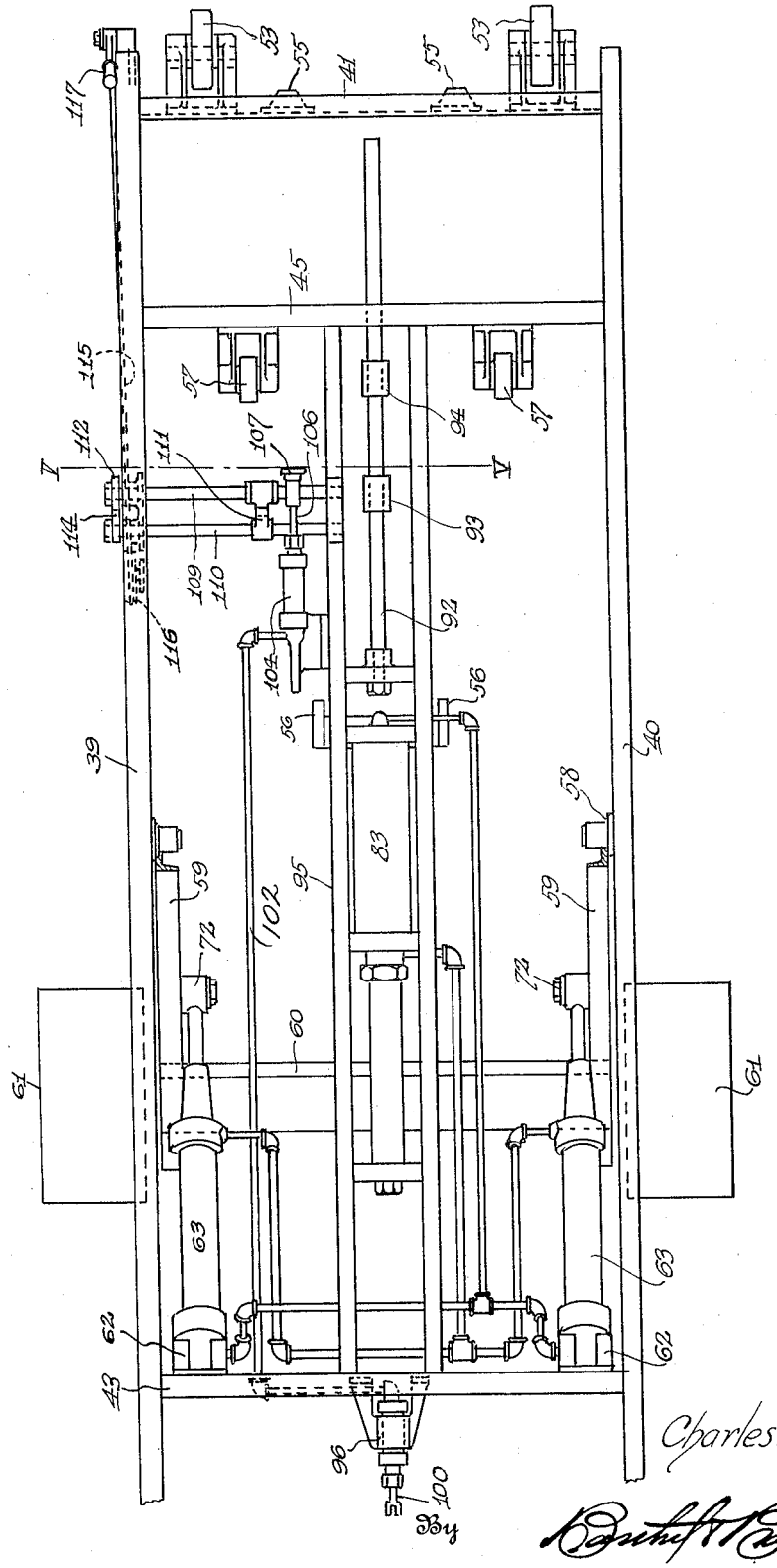
Fig. 3 is an enlarged plan of the forward end of the trailer shown in Figs. 1 and 2, illustrating a slight modification of my invention.

I have deemed it only necessary to diagrammatically illustrate the rear trailer supporting end of a tractor, which includes, among other things, a chassis 1 having its rear end provided with an inclined track or rails 2. On the chassis 1 is a circular stationary fifth wheel member 3 for the rollers 4 of a tiltable and turnable fifth wheel member generally designated 5. These superposed fifth wheel members have a hollow or tubular swivel connection 6, best shown in Figs. 12 to 14, inclusive, said swivel connection functioning as a king pin so that the fifth wheel member 5 may turn about a vertical axis. The fifth wheel member 5 also has a tiltable movement relative to the fifth wheel member 3 and for this purpose there are a series of bearings 7 on a transverse shaft 8 supporting the rollers 4 of the fifth wheel member 5. The fifth wheel member 5 has a further movement longitudinally of the fifth wheel member 3 and such movement is permissible by a conventional form of draft appliance 9, best shown in Fig. 12. The reciprocable and rotatable movements of the fifth wheel member 5 are essential during combined services of the tractor and trailer, and the tiltable movement of the fifth wheel member 5 contributes to such service, but more particularly the coupling and uncoupling of the tractor and trailer. The fifth wheel member 5 is tiltable so that its rear end may aline with the track or rails 2 to permit of the tractor being backed under the forward end of the trailer, whereby trailer wheels or rollers are caused to ascend the track or rails 2 and place the forward end of the trailer in an operative coupled relation to the fifth wheel member 5.

The fifth wheel member 5 is a framework, rectangular in plan, fabricated from structural steel and includes a front transverse member 10, a rear transverse member 11, side rail members 12, longitudinal members 13 and 14, and a platform 15. At the forward ends of the longitudinal members 13 and 14 are bearings 16 for a transversely disposed rock shaft 17 provided with hook shaped beveled cranks or coupling members 18 adapted for engagement with the forward ends of the trailer. The coupling members 18 are held normally horizontal or in a closed position by a coiled retractile spring 19 connecting a crank 20 of the shaft 17 to the platform 15. The coupling members 18 are beveled, as at 21, so that trailer engagement with said coupling members will cause the same to swing downwardly until the trailer engages socket buffers 22 carried by the bearings 16, when the retractile force of the spring 19 swings the coupling members 18 to a raised active or closed position for securing the forward end of the trailer to the fifth wheel member 5. In order that the coupling members 18 may be swung downwardly to uncouple the trailer relative to the fifth wheel member 5, a manually operable cable 23 is attached to the crank 20. This cable is trained about a sheave 24 carried by the front member 10, said cable extending rearwardly to a sheave 25 supported under the platform 15, then downwardly through the swivel connection 6, under a sheave 26 in the lower end of the swivel connection, and then forwardly on the tractor, whereby the driver of the tractor may pull upon the cable 23 to actuate the coupling members 18. The tractor equipment may include a lever, ratchet or any suitable mechanism by which the tractor driver may pull upon the cable 23 for an uncoupling operation.

On the rear transverse member 11 is a stationary impact lug 27 and adjacent the rear end of the longitudinal member 13 is a slidable impact brake lug 28. This slidable lug is carried by a longitudinal slotted head 29 bearing on studs 30, supported from a bearing 31 on the longitudinal member 13. The slide head 29 is loosely engaged by a pivoted horizontally disposed lever 32 supported from a bracket 33 on the longitudinal member 14. Attached to the lever 32 is a cable 34 extending rearwardly about a sheave 35 under the platform 15, then forwardly over a sheave 36 in proximity to the sheave 25, and downwardly over a sheave 37 associated with the sheave 26. The cable 34, like the cable 23 extends forwardly on the tractor for manipulation by the tractor driver in connection with the trailer brakes, as will hereinafter appear.

On the platform 15 is a stationary trailer brake trip lug 38.

Reference will now be had to the trailer construction and equipment as best disclosed in Figs. 1 to 11 inclusive with attention to Figs. 1 to 4 inclusive for the trailer chassis, which comprises side frames 39 and 40 connected by a front transverse member 41, a rear transverse member 42, and intermediate transverse members 43, 44 and 45.

The rear end of the trailer chassis is supported by a truck frame 46, a spring suspension 47, and a rear axle assembly 48, said rear axle assembly including a conventional form of brake mechanism 49 operable by rods 50 extending to the cranks 51 of a rock shaft 52 supported from the truck frame 46.

The front transverse member 41 of the trailer chassis has a set of wheels or rollers 53 adapted to engage the truck or rails of the tractor, when the rear end of the tractor is backed under the forward end of the trailer, said wheels 53 ascending the rails 2 and the tilted fifth wheel member 5 until the fifth wheel member 5 is swung to a horizontal position for coupling to the trailer chassis. This coupling is accomplished by the transverse member 41 of the trailer chassis contacting with the beveled edges 21 of the coupling members 18 and riding over said coupling members until the members may snap upwardly into a closed position, as shown in Fig. 15. The transverse member 41 may be provided with a wear plate 54 for engagement with the coupling members 18, and on the front side of the transverse member 41 are buffers or positioning members 55 adapted to enter the socket buffers 22 and define a correct position of the rear end of the tractor relative to the front end of the trailer. The buffers are spaced apart so as to establish connection between the forward end of the trailer chassis and the fifth wheel member 5 to prevent lateral displacement of one relative to the other. In addition to these buffers and the coupling members 18 are underlying clips 56 adapted to engage under the rear transverse member 11 of the fifth wheel member 5. These clips will prevent vertical displacement of the forward end of the trailer relative to the fifth wheel member and cooperate with the buffers and coupling members in establishing the connection as though the fifth wheel member 5 was permanently attached to the forward end of the trailer chassis.

On the transverse member 45 of the trailer chassis are a set of wheels or rollers 57 which are adapted to bear on the platform 15 and cooperate with the wheels 53 in supporting the forward end of the trailer relative to the fifth wheel member 5 so that there may be a longitudinal movement of either when uncoupled.

Mounted on the inner sides of the chassis frames 39 and 40, intermediate the forward end of the trailer and the truck frame 46, are bearings 58 to which is pivotally connected the upper end of a swingable leg structure embodying side members 59, an axle 60 and ground engaging wheels 61. This leg structure is sometimes termed a support or prop and may be of any well known construction, even to the extent of including steerable ground engaging wheels, so that the trailer may be moved and steered about independent of the tractor.

Adjacent the ends of the transverse member 43 are bearings 62 to which are pivotally connected leg hydraulic cylinders 63. One of these cylinders is best shown in Fig. 9 as including a cap 64 having trunnions 65 and a passage 66 communicating with the upper end of the cylinder 63 and extending to the end of the inner trunnion 65. On the lower end of the cylinder 63 is a cap 67 having a connection 68 communicating with the lower end of the cylinder 63. This cap includes a stuffing box 69 for a piston rod 70 that is reciprocable in the cylinder 63 and equipped with a conventional form of piston 71 within the cylinder. The outer end of the piston rod is pivotally connected, as at 72, to the side members 59 of the leg structure.

Connecting the front transverse member 41 and the intermediate transverse members 45 and 44 are longitudinal parallel members 73, and suitably mounted between these members are opposed main cylinders 74 and 75. Slidable in the cylinders 74 and 75 is a piston equipped rod 76 provided with spaced abutments 77 and 78 between said cylinders. The forward end of the cylinder 75 is connected to a pipe 79 extending rearwardly with branches 80 connected to the passage trunnions 65 of the cylinder caps 64, thus establishing communication between the cylinder 75 and the upper ends of the cylinders 63.

The rear end of the cylinder 74 is connected by a pipe 81 and branches 82 to the connection 68 of the cylinder 63, thus establishing communication between the cylinder 74 and the lower ends of the cylinder 63.

In the cylinders 74, 75 and 63, also the pipe connections between said cylinders, is placed a quantity of oil or other liquid that can be conveniently circulated between the cylinders with the circulation induced by movement of the piston equipped rod 76. Movement of this rod is adapted to cause the liquid to reciprocate the piston rod 70 connected to the leg structure and thus swing the leg structure for an inactive or active position.

Instead of using the cylinders 74 and 75, as shown in Figs. 1 and 2, I may use a single double acting cylinder as shown in Figs. 3, 4 and 8. The cylinder is designated 83 and has a stuffing box cap 84 provided with a connection 85. Another cap 86 for the cylinder 83 has a connection 87 and reciprocable in side extensions of the caps 84 and 86 are slide rods 88 connected by cross heads 89 and 90. Connected to the cross head 89 and reciprocable in the stuffing box cap 84 is a piston equipped rod 91. The cross head 90 has a forwardly extending actuating rod 92 provided with abutments 93 and 94 for the same purpose as the abutments 77 and 78, as will hereinafter appear.

While considering this modification in connection with Figs. 3 and 4, it may be noted that the cylinder 83 is supported from longitudinal members 95 connecting the transverse member 45 to the transverse member 43; that the transverse member 44 is dispensed with, and that the set of rollers 57 are mounted on the rear side of the transverse member 45, instead of the front side thereof as shown in Figs. 1 and 2.

The trailer brake control mechanism includes a rearwardly extending bracket 96 on the transverse member 43 and mounted in said bracket is a small cylinder 97 having a stuffing box cap 98 and a passage cap 99. Reciprocable in the stuffing box cap 98 is a piston equipped rod 100 pivotally connected to a crank 101 of the brake rock shaft 52.

The passage cap 99 of the cylinder 97 is connected by a forwardly extending pipe 102 to the passage and guide cap 103 of a cylinder 104 supported from one of the longitudinal members 73, between the transverse members 44 and 45, as best shown in Figs. 1 and 2. The cylinder 104 has a stuffing box cap 105 for a reciprocable piston equipped rod 106. See Fig. 11. On the outer end of the rod 106 is a head 107 and connected to said head by a pin and slot connection is a crank 108 of a rock shaft 109 journaled in the chassis frame 39 and the adjacent longitudinal member 73. Extending parallel to the rock shaft 109 is another shaft 110 provided with a lug 111 adapted to be engaged and raised to rock the shaft 110 by a lug 130 carried by a sleeve 131 loose on the shaft 109. The sleeve 131 has a depending crank 132 and when this crank is struck and moved rearwardly the shaft 110 is rocked. See Figs. 5, 6 and 7. On the outer end of the shaft 109 is a ratchet wheel 112 and a crank 113. Engaging the ratchet wheel 112 is a pawl 114 carried by the shaft 110, said pawl being disengaged from the ratchet wheel 112 when the shaft 110 is rocked.

Connected to the crank 113 of the rock shaft 109 is a cable 115 trained over a sheave 116 supported from the chassis frame 39. The cable 115 extends forwardly and is connected to a hand lever 117 pivotally mounted on the forward end of the chassis frame 39. See Figs. 1 to 4 inclusive.

A quantity of oil is placed in the cylinders 97 and 104, also the pipe connection 102 between said cylinders, so that when the piston equipped rod 106 is reciprocated the brake rock shaft 52 may be rocked to set or release the trailer brakes 49.

*Coupling operation.*—When the rear end of the tractor is backed under the forward end of the trailer and the trailer wheels 53 ascend the rails 2 on to the fifth wheel member 5, this fifth wheel member is tilted to a horizontal position, as shown in Fig. 15, thus placing the impact lug 27 of the fifth wheel member 5 between the abutments 77 and 78, or between the abutments 93 and 94, as shown in Fig. 15. The lugs 28 and 38 are also placed in operative relation to the shaft 109, so that the lug 28 may engage the head 107 of the piston rod 106 and the lug 38 engage the crank 132 of the shaft 109.

Immediately upon the fifth wheel member 5 assuming a horizontal position by the trailer wheels 53 having passed over the transverse center line or axis of the shaft 8, there is still further movement for the tractor relative to the trailer which causes the leg control lug 27 to actuate the piston rod 76 by contact with the abutment 77, which is forced to the dotted line position shown in Fig. 1. This rearward movement of the piston rod 76 forces liquid from the cylinder 74 into the lower ends of the cylinder 63 and causes the piston rods 70 to elevate the leg structure to an inactive position, as shown by dotted lines in Fig. 2. The leg structure is retained in a raised position as long as the leg control lug 27 engages the abutment 77. By this time a coupled relation has been established between the forward end of the trailer and the rear end of the tractor by virtue of the buffers 22 and 55, the coupling members 18, and the clips 56. The slidable lug 28 has been placed in front of the head 107 and should the tractor operator, during transit of the tractor trailer combination desire to apply the brakes of the trailer, the cable 34 is pulled upon which swings the lever 32 rearwardly causing it to force the piston rod 106 rearwardly. The liquid in the cylinder 104 is forced into the pipe 102 and as this pipe and the cylinder 97 are charged the piston rod 100 is pushed rearwardly to rock the shaft 52 and set the trailer brake mechanism 49.

The lug 38 contacts with the crank 132 and causes the shaft 110 to be rocked to raise the pawl 114. The pawl is retained in this raised position during the combined service condition of the tractor and trailer and a rider of the trailer may manipulate the hand lever 117 should it be necessary to apply the trailer brakes. The hand lever is primarily intended for manipulation when the trailer is independent of the tractor, because the trailer brakes can be set to hold the trailer against accidental movement and this is particularly true when the tractor is to back into engagement with the trailer. In practice the trailer will be left alone with its brakes set, and when the tractor backs into engagement with the trailer the pawl 114 will be raised and maintained so, thus freeing the trailer brake mechanism for manual control from the tractor.

*Uncoupling operation.*—The tractor driver pulls upon the cable or flexible connection 23 and lowers the coupling members 18. With these coupling members releasing the front transverse member 41 of the trailer, the tractor may pull away from the trailer. In doing so the lugs 28 and 38 are free to move forward, but the lug 27 is still between the abutments 77 and 78 and by virtue of the abutment 78 causes the piston rod 76 to be moved forwardly. This produces another circulation of oil by the oil being forced out of the cylinder 75, pipe 79 and its branches 80 into the upper ends of the cylinders 63, whereby the leg structure is lowered to an active position. The oil in the lower ends of the cylinders 63 is forced into the pipe branches 82 and oil from the pipe 81 returned to the cylinder 74.

As the leg structure reaches an active trainer supporting position, as shown by full lines in Fig. 2, the wheels 53 of the trailer have passed over the transverse pivotal axis of the fifth wheel member 5, causing said member to tilt rearwardly and remove the lug 27 from an active position between the abutments 74 and 77. The tractor can continue to move forward with the trailer wheels 53 riding down off of the rails 2 of the tractor, and the trailer is now alone so that it may be moved about independent of the tractor.

Before uncoupling the tractor driver may set the trailer brakes so that the trailer will not follow the tractor as it pulls away, and the trailer hydraulic brake mechanism has been made the subject matter of another application.

I attach considerable importance to the hydraulic leg raising and lowering mechanism being set in action by the backing movement of a tractor having a fifth wheel member automatically engageable with the hydraulic mechanism for positively raising or lowering the trailer leg. The tilting of the tractor fifth wheel member is automatic by virtue of the engagement with the trailer, so only manual operations are involved for control of the trailer brakes from the tractor and for shifting the coupling members incident to an uncoupling operation.

It is thought that the utility of my invention will be apparent without further description, and while in the drawings there are illustrated the preferred embodiments of my invention it is understood that the structural elements are susceptible to such changes as are permissible by the appended claims.

What I claim is:—

1. In a tractor trailer combination, a trailer, a leg structure adapted to be raised and lowered relative to said trailer, a hydraulic mechanism on said trailer adapted for raising and lowering said leg structure, said hydraulic mechanism including pivoted leg cylinders and reciprocable piston rods connected to said leg structure, a tractor, and means on said tractor engageable with said hydraulic mechanism adapted to actuate said hydraulic mechanism when said tractor is backed relative to said trailer.

2. A tractor trailer combination as called for in claim 1, wherein said hydraulic mechanism includes main cylinders all in advance of said pivoted leg cylinders.

3. A tractor-trailer combination as called for in claim 1, wherein said hydraulic mechanism includes cylinders containing a liquid adapted for moving piston rods with some of said rods directly connected to said leg structure.

4. In a tractor trainer combination wherein a trailer has a supporting leg structure adapted to be adjusted by movement of a tractor relative to the trailer;—means set in operation by tractor movement for adjusting said leg structure, said means including a set of hydraulic cylinders disposed at an angle to the horizontal and having shiftable piston rods connected to said leg structure, a main cylinder communicating with said set of cylinders and having a shiftable piston rod, and a tiltable member on said tractor adapted to engage the last mentioned piston rod to effect movement thereof when said tractor is moved relative to said trailer.

5. A tractor trailer combination as called for in claim 4, wherein said tiltable member affords a fifth wheel action for the forward end of said trailer relative to said tractor.

6. A tractor trailer combination as called for in claim 4, wherein said tiltable member is tiltable under the influence of said trailer incident to shifting the rear end of the tractor relative to said trailer.

7. A tractor trailer combination as called for in claim 4, further characterized by coupling members on said tiltable member automatically engageable by said trailer to establish a coupled relation between said tractor and trailer.

8. In a tractor trailer combination wherein a trailer chassis has a leg structure adapted to be raised and lowered, and wherein the rear end of a tractor is adapted to be shifted under the forward end of the trailer chassis and coupled thereto;—a liquid holding cylinder pivotally mounted below said trailer chassis and having a piston rod cooperating with said cylinder in establishing an operative connection with said leg structure, means adapted for moving the liquid in said cylinder to effect adjustment of said leg structure, a tiltable fifth wheel member on said tractor brought into active position relative to said mechanism by initial movement of said tractor under said trailer and adapted to actuate said liquid moving means by further movement of said tractor relative to said trailer, and coupling means operative by the last mentioned movement of said tractor relative to said trailer adapted to establish a coupled relation between said tractor and trailer.

9. A trailer comprising a chassis, a truck at the rear end of said chassis, a swingable leg structure adapted for supporting the forward end of the trailer chassis, a set of cylinders and piston rods supported below said chassis and connected to said leg structure, a cylinder carried by said chassis and communicating with the set of cylinders and adapted to contain a liquid adapted to be forced into and out of said set of cylinders, and a piston rod disposed in said cylinders to be actuated to cause a circulation of liquid for reciprocating the other piston rods so that said leg structure may be swung.

10. In a tractor trailer combination, a a trailer chassis, a truck supporting the rear end of said trailer chassis, and provided with brakes, a swingable leg structure carried by said trailer chassis and adapted to support the forward end thereof, hydraulic means pivotally connected to said trailer chassis and to said leg structure adapted to be actuated to cause a swinging movement of said leg structure, hydraulic means carried by said trailer chassis adapted to control the brakes of the trailer truck, a tractor, and tiltable means on said tractor adapted to be connected to the forward end of said trailer and establish a coupled and operative connection between said tractor and trailer whereby the hydraulic brake control means may be controlled from said tractor.

11. A tractor trailer combination as called for in claim 10, wherein said tiltable means includes a fifth wheel member on said tractor, a lug carried thereby placed in operative relation to the leg hydraulic operating means so that movement of said tractor relative to said trailer may swing said leg, and a slidable lug operatable from said tractor for actuating the brake hydraulic means of said trailer.

In testimony whereof I affix my signature.

CHARLES H. LAND.